United States Patent
Steffani

(10) Patent No.: US 9,592,737 B2
(45) Date of Patent: Mar. 14, 2017

(54) REDUNDANT DRIVE SYSTEM

(71) Applicant: Siemens Aktiengesellschaft, München (DE)

(72) Inventor: Hans Friedrich Steffani, Nürnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/111,696

(22) PCT Filed: Jan. 7, 2015

(86) PCT No.: PCT/EP2015/050133
§ 371 (c)(1),
(2) Date: Jul. 14, 2016

(87) PCT Pub. No.: WO2015/106993
PCT Pub. Date: Jul. 23, 2015

(65) Prior Publication Data
US 2016/0347180 A1    Dec. 1, 2016

(30) Foreign Application Priority Data

Jan. 15, 2014  (EP) .................................... 14151300

(51) Int. Cl.
*H02P 7/00* (2016.01)
*H02K 9/00* (2006.01)
(Continued)

(52) U.S. Cl.
CPC ............. *B60L 3/003* (2013.01); *B60L 3/0092* (2013.01); *B64D 27/24* (2013.01); *H02P 5/74* (2013.01);
(Continued)

(58) Field of Classification Search
CPC .. H02P 3/22; H02P 25/22; H02P 27/06; H02P 5/74; H02P 3/14; H02P 3/18;
(Continued)

(56) References Cited

U.S. PATENT DOCUMENTS

2006/0049788 A1* 3/2006 Kifuku ................. B62D 5/0484
                                                        318/432
2007/0070667 A1   3/2007 Stancu
2013/0200827 A1   8/2013 Nakano

FOREIGN PATENT DOCUMENTS

EP        0 588 628 A1   3/1994
WO    WO 2014-006157 A1  1/2014

* cited by examiner

*Primary Examiner* — Bentsu Ro
*Assistant Examiner* — Zemenay Truneh
(74) *Attorney, Agent, or Firm* — Henry M. Feiereisen LLC

(57) ABSTRACT

The invention relates to a drive system (1). The drive system (1) has at least two inverters (3, 31, 32, 33) and at least two motors (2). Each of the motors (2), each of which has a stator and a rotor, has at least one first coil system (21) and a second coil system (22) in the stator. Each first coil system (21) is connected to a first inverter (31) in an electrically conductive manner, and each second coil system (22) is connected to a second inverter (32) in an electrically conductive manner. The invention further relates to a method for the redundant operation of a drive system (1), wherein at least one motor exchanges electric energy with the second inverter (32) and/or one or more additional inverters (33) if the first inverter (31) fails.

19 Claims, 6 Drawing Sheets

(51) Int. Cl.
  *B60L 3/00* (2006.01)
  *B64D 27/24* (2006.01)
  *H02P 25/22* (2006.01)
  *H02P 27/06* (2006.01)
  *H02P 5/74* (2006.01)
  *H02P 3/22* (2006.01)

(52) U.S. Cl.
  CPC .............. *H02P 25/22* (2013.01); *H02P 27/06* (2013.01); *B60L 2200/10* (2013.01); *B60L 2200/26* (2013.01); *B60L 2220/42* (2013.01); *B60L 2220/56* (2013.01); *B60L 2240/423* (2013.01); *H02P 3/22* (2013.01)

(58) Field of Classification Search
  CPC .... B60L 3/003; B60L 3/0092; B60L 2220/42; B60L 2220/56; B60L 2240/423; B64D 27/24; B62D 5/0484; G05B 21/02; G05B 9/02; H02H 7/0816; H02H 7/0822
  USPC ............................................ 318/432; 310/59
  See application file for complete search history.

REDUNDANT DRIVE SYSTEM

CROSS-REFERENCES TO RELATED APPLICATIONS

This application is the U.S. National Stage of International Application No. PCT/EP2015/050133, filed Jan. 7, 2015, which designated the United States and has been published as International Publication No. WO 2015/106993 and which claims the priority of European Patent Application, Serial No. 14151300.2, filed Jan. 15, 2014, pursuant to 35 U.S.C. 119(a)-(d).

BACKGROUND OF THE INVENTION

The invention relates to a drive system, wherein the drive system has at least two inverters and at least two motors. The invention further relates to a method for the redundancy principle of a drive system.

In electrical drive technology, motors are used both to drive machines and also to accelerate or decelerate vehicles. In this case, the motors are supplied with energy by means of power electronics actuators. This power electronics system is used in closed-loop control or open-loop control as an actuator for the transmission of energy from the energy supply system to the motors. Inverters are used as power electronics actuators for three-phase motors, such as a synchronous motors or an asynchronous motor. In the process, one inverter is used for each motor in many fields of application. This has the advantage that, when there are a plurality of motors, each of said motors can be individually subjected to closed-loop control in respect of torque. In another more cost-effective variant, a plurality of motors, for example two or four, are supplied by one inverter. The costs of the drive system can be reduced owing to this arrangement, which is also called a group drive. However, individual closed-loop control of the motors in respect of torque distribution between the connected motors is no longer possible with this arrangement. At the same time, failure of an inverter then has an effect on all of the motors which are supplied by it, so that said motors can no longer contribute to the drive task. The ability to further maintain operation even in the event of failure of a drive component is called redundancy. Analogously, operation in the event of failure of a drive component is known as redundant operation. Even in the case of an arrangement in which a motor is supplied by in each case one inverter, it has proven disadvantageous when an inverter fails. This has the result that even the motor in question can no longer deliver torque.

In order to prevent the failure of an entire motor, motors with two winding systems are used. In this case, each of the two winding systems is fed by a separate inverter. In the event of failure of an inverter, only some of the torque which can be delivered by the motor is now lost. One disadvantage of this arrangement is the increased costs which arise owing to the additional winding system. At the same time, higher costs are also created owing to the higher number of inverters in comparison to the group drive.

SUMMARY OF THE INVENTION

The invention is based on the object of specifying a drive system which still allows operation of all of the motors even in the event of failure of an inverter, and in the process can be produced in a cost-effective manner at the same time.

This object is achieved by a drive system, wherein the drive system has at least two inverters and at least two motors, wherein the motors each have a stator and a rotor, wherein the at least two motors each have at least a first winding system and a second winding system in the stator, wherein the respective first winding system is electrically connected to a first inverter and the respective second winding system is electrically connected to a second inverter. This object is further achieved by a method for redundant operation of a drive system, wherein the motors exchange electrical energy with the second inverter in the event of failure of a first inverter.

The invention is based on the knowledge that the fail-safety for a drive system comprising two or more motors can be increased by the motors being designed with a plurality of winding systems in the stator. In this case, the winding systems of a motor can each be designed identically or differently. If the winding systems are of identical design, that is to say are designed with the same number of turns in particular, a symmetrical position of the winding systems can ensure that it is not possible to distinguish between the individual winding systems of a motor. The assignment as to which winding system is the first, the second and the further winding system is then defined by which inverter the respective winding system is connected to.

In this case, the assignment of the inverters, that is to say the designation of which inverter is the first inverter and which inverter is the second inverter, depends on which winding system of the motor the inverter is connected to. Particularly in the case of drive systems comprising more than two motors and more than two inverters, it is possible in this case that a particular inverter is, for example, the first inverter for a first motor and is the second inverter for another motor. Accordingly, the designation of the individual inverters can differ for the individual motors. This is also described in greater detail with reference to FIG. 6.

The motors may be DC motors or AC motors. AC motors may be asynchronous motors or synchronous motors. The rotor can be designed as a squirrel-cage rotor, slip-ring rotor, reluctance rotor or as a permanent-magnet rotor. In this case, the different winding systems of a motor are fed by different inverters. In order to design the drive system in a cost-effective manner, each inverter feeds winding systems from a plurality of motors. In this case, it has been found to be particularly advantageous when the number of inverters is identical to the number of motors. In an exemplary design comprising two inverters and two motors, the two motors, which are connected to this inverter, can still provide half of their torque or their power in the event of failure of one inverter. In this case, the question of whether the torque or the power is the limiting element depends, inter alia, on the operating point or other components, such as the cooling system, of the motor. It may be advantageous to dimension the inverters to be relatively large in respect of the torque and/or power which is available at the motor, so that more than half the drive torque or the drive power is still available in the event of failure of an inverter, that is to say during redundant operation. Therefore, when the inverters are dimensioned for 120%, at least 60% of the capacity is still available in the event of failure of one inverter. Depending on the dimensioning, values in the range of from 50% to 100%, in particular 66%, 75% or 90%, are possible and expedient for the capacity available at the motor in the event of failure of one inverter. The capacity of a motor can be given by its torque, its power or its behavior in the case of field weakening, and a combination of these variables. The selection of the torque which can be realized in the event of a malfunction or the power which can be realized depends, inter alia, on the application.

The property of redundancy of the electrical drive system is, for example, particularly advantageous when used in electrically operated vehicles, such as rail vehicles, land vehicles, aircraft or watercraft. For example, particular advantages are produced when used in airplanes. When the two motors, of which the capacity is reduced owing to failure of one inverter, are arranged on opposite sides of the airplane, for example one motor on the right-hand-side wing and one motor on the left-hand-side wing, failure of one inverter has a uniform effect on both of these sides of the airplane since both motors can continue to be operated at reduced power. Special measures for stabilizing the airplane, for example in the direction of flight, which measures would be necessary on only one side of the airplane in the event of failure of an entire motor, can therefore be omitted. However, this drive has also proven advantageous for other types of vehicle, such as rail vehicles for example. Therefore, advantages are also produced here taking into consideration an exemplary arrangement in which two motors comprising in each case two converters are fed by means of in each case two separate winding systems in the motors. In the event of failure of one of the two inverters, the maximum torque reduces, depending on the design, for example to approximately half. However, a reduction in the maximum torque from two motors to approximately half is more favorable than failure of an entire motor. The maximum torque which can be transmitted between the wheel and a rail can be considerably reduced particularly given unfavorable weather conditions such as snow, rain or ice. Therefore, a higher torque of a motor can no longer be utilized at all. If, as described, the failure of an inverter results in the failure of an entire motor, start-up of the train uphill may be entirely impossible. This immobilization causes expensive rescue operations and leads to discontent amongst passengers.

The described drive system also provides advantages for other vehicles, such as cars, trucks or buses for example, which are driven by wheels or chains. For reasons of driving stability, both wheels of an axle are always driven in most drive configurations. In order to be able to still ensure a stable driving behavior in the event of failure of an inverter, it is more favorable when both wheels of an axle continue to operate at reduced power than when the full drive power is provided on the wheel on one side of the axle and no drive power is provided on the wheel on the other side. Therefore, owing to the drive system according to the invention, a sufficiently good driving behavior can still be realized in a simple and cost-effective manner in the event of failure of one inverter.

In the case of ships, advantages are produced particularly when there is more than one propeller. As in the case of an airplane, reduction in the drive power at the existing propellers is more favorable than failure of the drive power of one propeller.

Further systems in which the reduction in the torque of two motors has a more favorable effect than the failure of an entire motor are, for example, conveyor systems. An example of a conveyor system which is particularly suitable for the use of the drive system according to the invention is a paper web. In the case of conveyor systems, an interruption in production generally occurs when a drive fails on one side and the drive continues to operate with a high torque on the other side. In the case of a conveyor belt for example, the loading on the belt increases considerably, with the result that the transportation belt may break in extreme cases. Even in the case of other transportation systems, for example by means of driven rollers, failure of a motor can have a considerably more negative effect on the product which is to be transported than a simultaneous reduction in the motor torque of several motors. These negative effects can be expressed by it no longer being possible to transport products or by the products being transported being deformed or damaged in some other way owing to different forces. In this case, the effects range from impeding production to large and expensive quantities of scrap material being produced. The drive system according to the invention is able to prevent these negative effects and to ensure reliable transportation, certainly both for the products being transported and the transportation system.

In a further advantageous refinement, the motors have further winding systems. Therefore, it is possible to feed the motors by way of further inverters. This reduces the capacity of the motor considerably less than if it was fed by only two inverters. In a first approximation, the capacity in the case of a motor with n identical winding systems in the event of failure of one inverter which is connected to one winding system is reduced by $1/n$. It has proven particularly favorable when the number of inverters is identical to the number of motors and the winding systems of these motors are each supplied by said inverters for this application too. The combination with three inverters on three motors, which each have three winding systems, has proven particularly favorable. Failure of an inverter reduces the capacity of the motors by at most 33% in this case. In the case of airplanes, this configuration has proven particularly favorable since, in this case, two motors can each be arranged symmetrically in relation to a movement axis of the airplane, and the third motor can be arranged in the immediate vicinity of the movement axis, comparably with the propeller of a single-motor airplane. This results in a particular degree of stability in flight. For reasons of symmetry, as already discussed above for vehicles, in particular aircraft, integer numbers of inverters and motors are also suitable in particular since these can be arranged symmetrically in many vehicles. A particularly favorable compromise between good redundancy behavior and favorable costs is represented by the drive system comprising four inverters and four motors which are each fed by the four inverters by means of four winding systems since, in this case, failure of one inverter has a uniform effect on all of the motors.

In a further advantageous refinement, the winding systems of the respective motors are electrically connected to inverters which are arranged on different intermediate circuits. For reasons of cost, it may be expedient to supply a plurality of inverters from an intermediate circuit and a corresponding associated input circuit, for example a rectifier or DC/DC converter instead of providing a dedicated intermediate circuit for each inverter. In this case, it has been found to be particularly advantageous that the winding systems of each motor are each supplied by inverters which are connected to different intermediate circuits. In order to be able to utilize the advantages of the redundant drive system in the best possible manner, faults and failures in the environment of the inverters should also have only a small effect on the capacity of the motors. One possible source of failures is, for example, the power semiconductor or the intermediate circuit capacitor. The failure of an intermediate circuit capacitor, for example due to a short circuit in the capacitor or its busbar system to which said intermediate circuit capacitor is connected, can, just like a broken-down power semiconductor, cause the simultaneous failure of the inverters which are connected to this intermediate circuit. Therefore, it is particularly advantageous to feed the winding systems of each motor by means of inverters which are supplied from different intermediate circuits. In this way, failure of an intermediate circuit has only a slight effect on the capacity of the respective motors which are supplied by means of said intermediate circuit. In this way, it is possible to ensure that failure of an intermediate circuit does not lead to complete failure of a motor.

In a further advantageous refinement, the winding systems of the individual motors are formed in such a way that a power distribution and/or torque distribution between the motors can be subjected to open-loop control and/or closed-loop control by the inverters. To this end, the winding systems in the motors are of different design in such a way that supply by the individual inverters has a different effect on each of the motors. This can be achieved by the winding systems differing from one another in respect of the number of turns or the position. In this case, an applied voltage or else change in voltage across the inverter has a different effect on the connected winding systems and therefore on the different motors. As a result, a distribution of the torque or of the power to the different motors can be realized by the inverters. Depending on the dimensioning of the windings in respect of the parameters such as number of turns and/or position of the windings in relation to one another mentioned by way of example, the motors react to different extents to the voltage which is applied to the winding systems by the different inverters. Torque or power can be distributed to the individual motors in this way. The difference in extent of the distribution of the torques and/or of the powers to the individual motors depends on the configuration of the winding systems, in particular the number of turns. The dimensioning of the non-uniform distribution depends on the application in this case. For vehicles, both land vehicles and also aircraft, this effect can be utilized, for example for traveling around corners, in such a way that torques can be designed differently for different sides of a vehicle, right/left and/or front/rear, in such a way as to increase the driving stability/stability in flight. Similarly, in the case of conveyor systems, the motors can be operated with increased torque in the regions which are currently under high load. This reduces the loading of the products being transported and/or the loading on any transportation belt, which may be present, of a conveyor system.

In this case, it has proven particularly favorable when the winding systems of a motor are of different design, but the motors are identical to one another. It is likewise favorable when the impedance, which is produced for the inverter at the output of the connected motors, is the same for all of the inverters. The assignment as to whether the inverter is a first, second or further inverter is given by the winding system of the motor which the inverter is connected to. Therefore, a different assignment of the inverters is generally given for each motor.

In a further advantageous refinement, switches are arranged in the electrical connections between the inverters and the winding systems of the motors. These switches allow redundant operation to continue in the event of failure of one inverter. If one inverter fails, voltages are further induced at the winding systems which are connected to this inverter. The reason for this is that the motors continue to operate and are supplied with energy by means of the other winding systems in such a way that a variable, magnetic flux is formed in the motor. Depending on faults in the inverter, this can produce, for example, high current, ground current, torque ripple, that is to say high-frequency fluctuations in torque, or other undesired effects which further damage the drive system or else can endanger the environment. In order to reliably preclude these effects, switches are arranged in the connections between inverter and winding system in order to electrically disconnect the inverter from the winding systems which are to be supplied by it in the event of a fault. In this case, it has proven particularly advantageous to arrange one or more switches at the output of each inverter, it being possible for all of the connections to the individual winding systems to be disconnected by way of said switch or switches. In this case, the switches can be of single-pole or multi-pole design.

In the case of the drive system according to the invention, it is possible to switch off an inverter or to disconnect it from the motor even without failure of an inverter, in order to, for example, minimize losses during operation in this way. This may be expedient, for example, when the motors, for reasons of operation, have to provide only a low torque or a low power which can be provided by a reduced number of inverters which are in operation. An inverter for servicing purposes can likewise be electrically disconnected from the motors. The advantage in this case is that the drive system does not have to be entirely switched off, but rather can continue to be operated at a reduced torque or reduced power. In this case, the switches can also be arranged such that it is possible to electrically disconnect individual motors from the drive system.

In a further advantageous refinement, a central control device is provided for driving the inverters and/or the switches. This has the advantage of driving the switches using an existing control device. On account of its measurement values, this central control device knows which operating state the drive system is in and whether there is a defect in an inverter. Depending on these or other parameters, the central control device can both switch off an inverter and also disconnect the electrical connection between this inverter and the connected motors.

It has proven particularly advantageous to provide a central control device both for driving all of the inverters and also all of the switches. This provides a particularly cost-effective realization possibility. The system can be yet further optimized in respect of costs and space requirement by the central control device being integrated in an inverter. Integration into a plurality of inverters has also proven expedient.

In an advantageous method for redundant operation of a drive system, the motors exchange electrical energy with the second inverter and/or one or more further inverters in the event of failure of a first inverter. In the case of a drive system of the kind presented above, this method allows redundant operation to be ensured in the event of failure of an inverter. Since each motor is connected to different inverters, the method ensures that, even in the event of failure of one inverter, the corresponding motors are still supplied with a sufficient amount of energy by means of the other inverters in order to still deliver torque. In this way, operation of the motors at reduced torque or reduced power in the redundant mode is possible and in addition can be realized in a cost-effective and simple manner.

In a further advantageous method, the flow of power between the inverters and the winding systems of the motors is coordinated by means of switches and/or a central control device. The switches have the effect of being able to electrically disconnect the inverters from the winding systems of the motors in the event of a fault. This is necessary particularly when a defect in an inverter would lead to a current flow if a voltage is applied to the output of said inverter. Since the motors are further fed by the non-defective inverters, an induced voltage is also produced in the winding system which is associated with the defective inverter. In order to ensure that no current flow results, the defective inverter is disconnected from its connected winding systems by the switches. Furthermore, the central control device has the task of coordinating the distribution of the individual torques or individual powers to the existing motors. This can always happen when the winding systems of the individual motors are of different design, as described above. Therefore, the central control device then has the options of controlling both the distribution of torque or of power to the individual motors and also switch off of individual inverters.

BRIEF DESCRIPTION OF THE DRAWING

The invention will be described and explained in greater detail below with reference to the exemplary embodiments which are illustrated in the figures, in which.

DETAILED DESCRIPTION OF PREFERRED EMBODIMENTS

Figure 1:
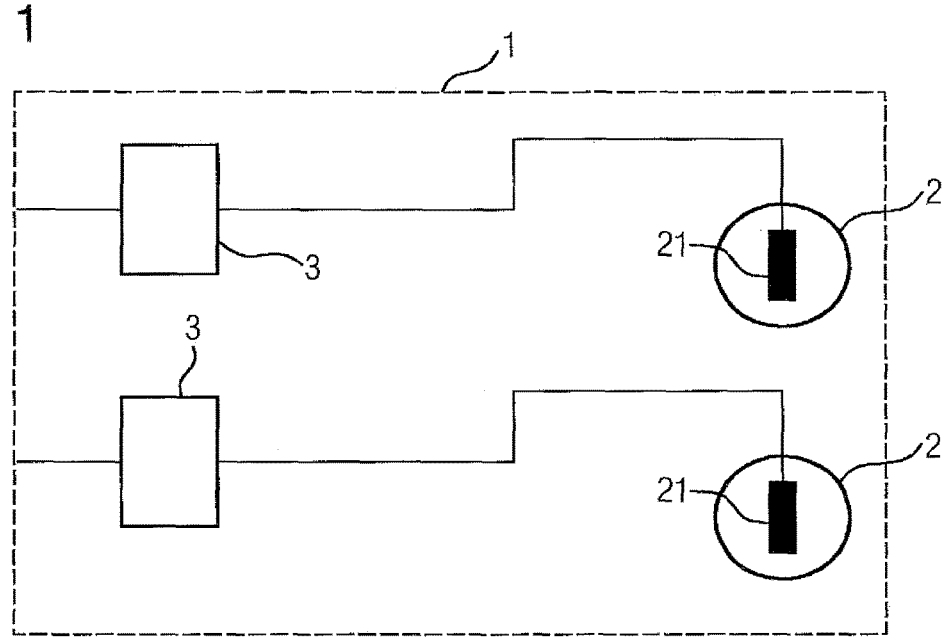
FIG. 1 shows a known drive system.

FIG. 1 shows a known drive system 1. Said drive system has two inverters 3 and two motors 2. The motors 2 for their part contain a winding system 21. The motors 2 are each fed by means of separate inverters 3. Owing to this arrangement, the motors 2 can be individually subjected to open-loop control or closed-loop control but the failure of an inverter 3 results in the motor 2 which is connected to said inverter likewise failing and therefore no longer being able to deliver any torque. Furthermore, group drives are known, in which an inverter 3 feeds a plurality of motors 2. Although this is more cost-effective than the design illustrated in FIG. 1, the ability to subject the individual motors 2 to open-loop control and/or closed-loop control is lost in the case of this group drive.

Figure 2:
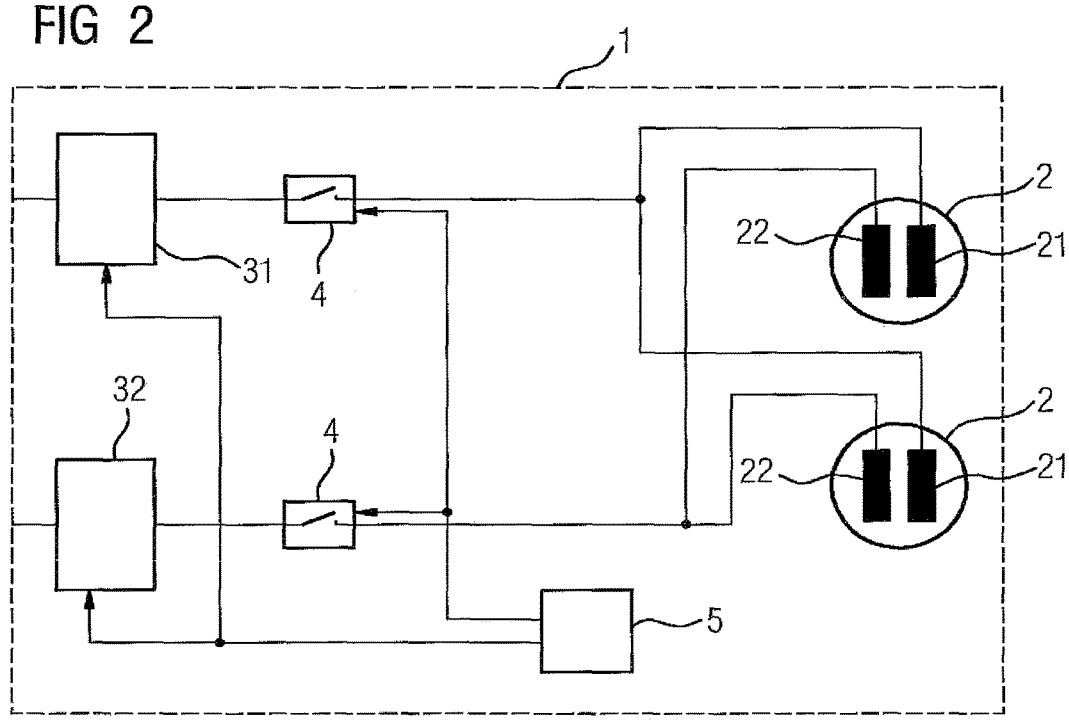
FIG. 2 shows a drive system according to the invention comprising a central control device.

FIG. 2 shows a drive system 1 according to the invention comprising two inverters 31, 32, two motors 2 and in each case one switch 4 at the output of the inverters 31, 32, and a central control device 5. The central control device 5 can be of separate design or can be integrated in one of the inverters 31, 32. In this exemplary application, the motors 2 each have two winding systems 21, 22. The two winding systems 21, 22 are each supplied with energy by an inverter 31, 32. A switch 4 is in each case arranged at the output of the inverters 31, 32. In the event of failure of one of the two inverters 31, 32, this switch 4 allows said inverter to be disconnected from the connected motors 2. In this case, the inverters 31, 32 and the switch 4 are driven by the central control device 5. To this end, the central control device 5 evaluates measurement signals which describe the state of the drive system 1, in order to drive the inverters 31, 32 and in the process to be able to control the drive system 1 at an operating point. These measurement signals are not illustrated in FIG. 2 for the sake of clarity. If the central control device 5 identifies a fault in one of the two inverters 31, 32, said central control device switches off said inverter and opens the associated switch 4 at the output of this inverter 31, 32. In this way, operation of the motors 2 is further possible by means of feeding the other inverter 32, 31.

The motors 2 each have two winding systems 21, 22. In this case, each winding system is fed by another inverter 31, 32. In this way, it is possible to ensure, in contrast to the drive system illustrated in FIG. 1, that the two motors 2 can still generate torques even in the event of failure of an inverter 31, 32. The designation of the winding systems 21, 22 is given by the inverter 31, 32 which said winding system is connected to. In this case, the winding systems 21, 22 can be of identical design, in particular in respect of the number of turns, or else of different design. If the first winding system 21 and the second winding system 22 are of identical design, the two motors 2 can continue to be operated at approximately half the maximum power or at half the maximum torque in the event of failure of one of the two inverters 31, 32. A higher capacity during redundant operation can be achieved by a correspondingly large dimensioning of the inverters 31, 32 and/or the motors 2.

Figure 3:
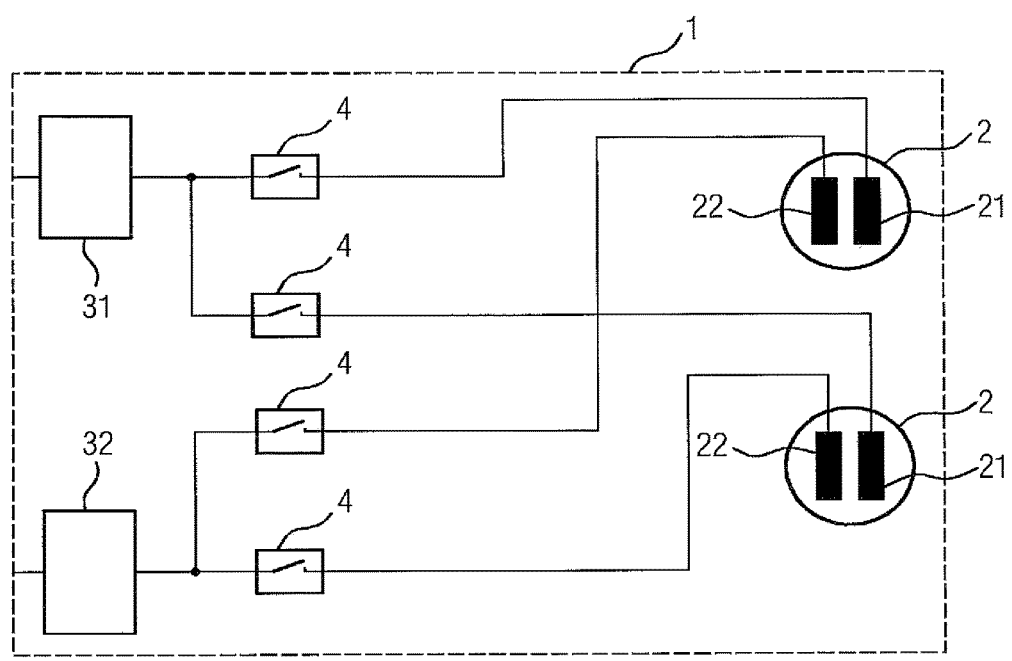
FIG. 3 shows a further drive system according to the invention comprising further switches.

FIG. 3 shows a further exemplary embodiment of a drive system 1 according to the invention. In order to avoid repetition in respect of corresponding constituent parts of the drive system 1, reference is made to the description relating to FIG. 2 and the reference symbols provided there. Illustration of the central control device 5 and the corresponding signals to the inverters 31, 32 and to the switches 4 has been dispensed with for reasons of clarity. In contrast to the drive system 1 illustrated in FIG. 2, the drive system 1 of FIG. 3 has switches 4 in the feed lines between inverters 31, 32 and winding systems 21, 22 of the motors 2. By virtue of this arrangement, it is possible not only to disconnect an inverter 31, 32 from the connected motors 2, but rather also conversely to disconnect a motor 2 from its connected inverters 31, 32. Therefore, by virtue of this arrangement of the switches 4, it is also possible to continue to supply the other motors 2 with energy from the inverters 31, 32 of the drive system 1 in the event of a defect in a motor 2. It is also possible to disconnect a motor 2 comprising both winding systems 21, 22 from its inverters 31, 32 for servicing reasons. A further possible way of arranging the switches involves arranging in each case one switch 4 at the output of the inverters 31, 32 and arranging a second switch 4 downstream of the branch to the individual motors 2, as seen from the inverter 31, 32. The arrangement of these switches 4 can be arranged in all of the branching connections, in some of the branching connections or else only in one branching connection.

Figure 4:
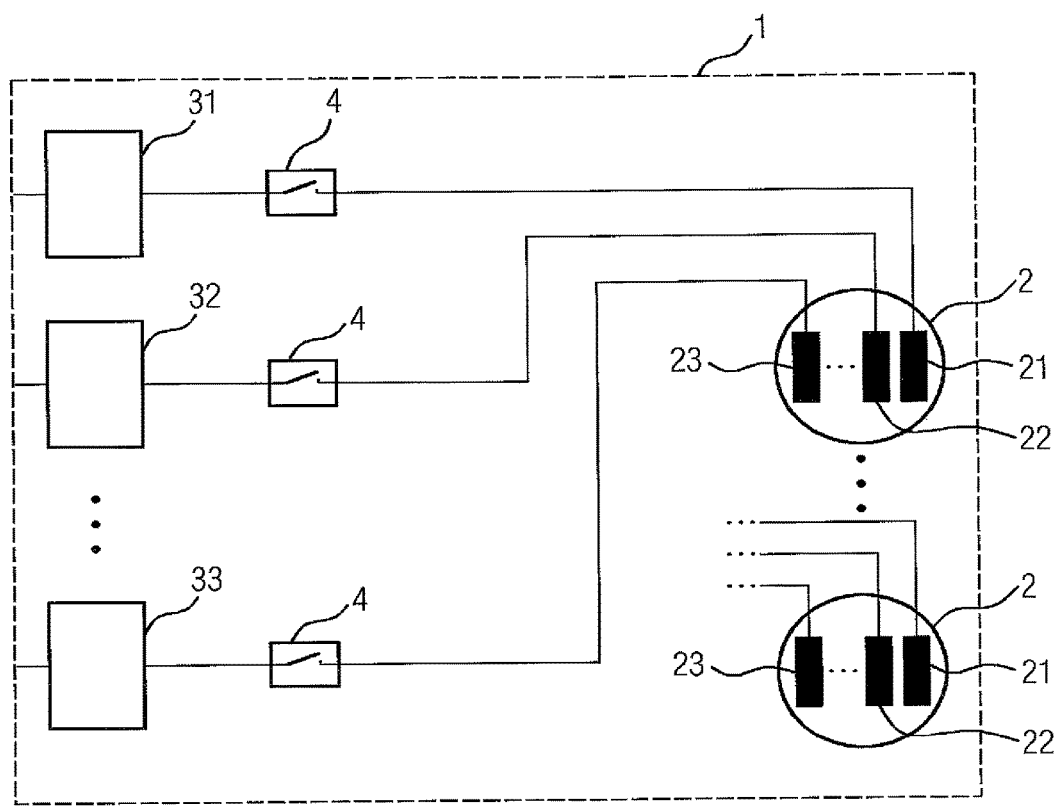
FIG. 4 shows a further drive system according to the invention comprising further winding systems and further inverters.

FIG. 4 shows a further exemplary embodiment of a drive system 1 according to the invention. In order to avoid repetition in respect of corresponding constituent parts of the drive system 1, reference is made to the description relating to abovementioned FIGS. 1 to 3 and the reference symbols introduced there. The motors 2 of this exemplary embodiment have a further winding system 23 in addition to the first winding system 21 and the second winding system 22 of the motor 2. It is likewise possible for said motors to have a plurality of further winding systems 23. The further winding system 23 is supplied with electrical power by means of one or more further inverters 33. A separate inverter 31, 32, 33 is provided for supplying each winding system in this example too. In this case, the present FIG shows only the connection of a motor 2 to the inverters 31, 32, 33 of the drive system 1 for reasons of clarity. In this case, the drive system 1 can have any desired number of motors 2. It has proven favorable when the number of motors 2 corresponds to the number of inverters 31, 32 and 33. Comparatively to FIG. 2, each inverter 31, 32, 33 has, at the output end, a switch 4 which, in the event of a fault in one of the inverters 31, 32, 33, allows said inverter to be disconnected from motors 2 which are to be supplied by it. As an alternative, it is also possible to arrange the switches in the feed lines between inverters 31, 32 and 33 and the winding systems 21, 22 and 23 in accordance with FIG. 3 and the descriptions provided there. The number of winding systems 21, 22 and 23 can also be smaller than the number of inverters 31, 32, 33 which are located in the drive system 1, depending on the application. The following figures show corresponding arrangements using the example of a motor 2 comprising two winding systems 21, 22. However, these arrangements, which are explained below with reference to FIG. 5 to FIG. 7, can be readily transferred to motors 2 comprising more than two winding systems 21, 22.

Figure 5:
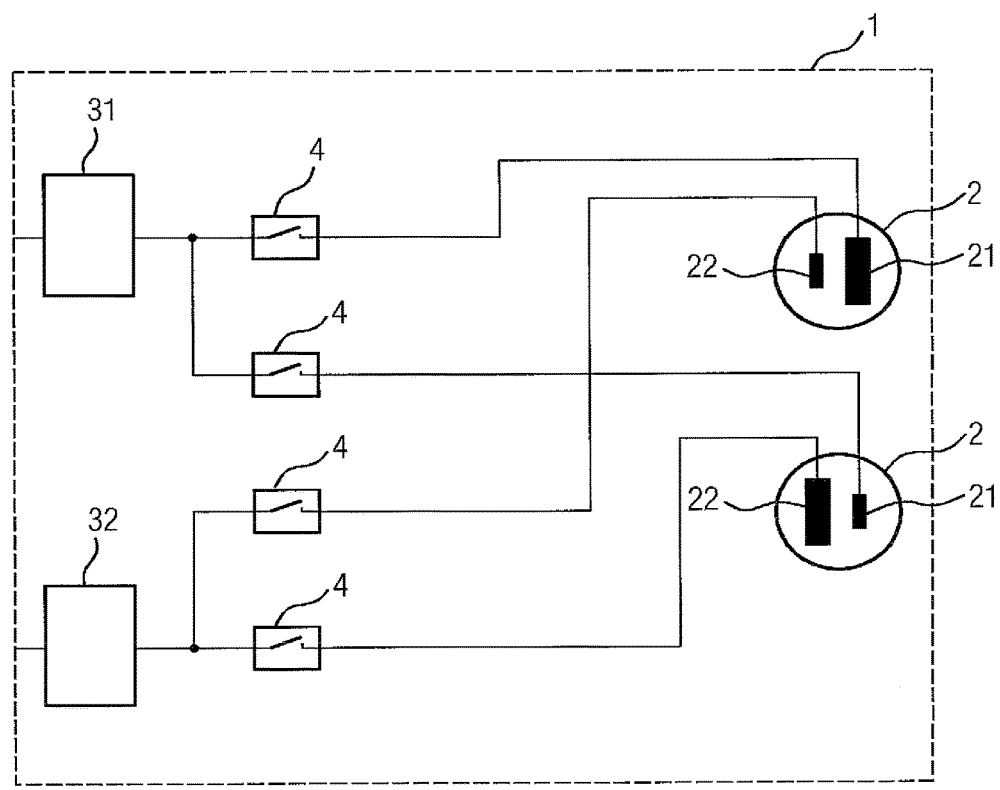
FIG. 5 shows a further drive system according to the invention comprising different winding systems in the respective motors.

FIG. 5 shows a further exemplary application of a drive system 1 in which the individual winding systems 21, 22 of a motor 2 differ. In order to avoid repetition in respect of corresponding constituent parts of the drive system, reference is made to the description relating to FIGS. 1 to 4 and the reference symbols introduced there. Driving of an inverter 31, 32 has a different effect on the individual motors 2 on account of the different form of the individual winding systems 21, 22. Specifically, this means that an output voltage across an inverter 31, 32 leads to different currents and therefore to different torques at the different, connected winding systems 21, 22 of the motors 2. Owing to this arrangement, it is possible, in accordance with the design of the motors 2, to distribute the corresponding torques or powers between the individual motors 2.

In this case, the motors 2 can be of identical design to one another. The voltage at the output of each inverter 3, 31, 32 affects the different motors 2 differently in this case. For example, in the illustrated exemplary embodiment, the first inverter 31 acts on the upper motor 2 in exactly the same way as the second inverter acts on the lower motor 2. The inverters each have a different influence on the respective other motors 2. Therefore, a distribution of the torques or the power to the individual motors can be influenced by a suitable output voltage from the inverters 31, 32, 33. This can be performed both by open-loop control or, by means of suitable feedback signals such as motor currents for example, by closed-loop control.

Figure 6:
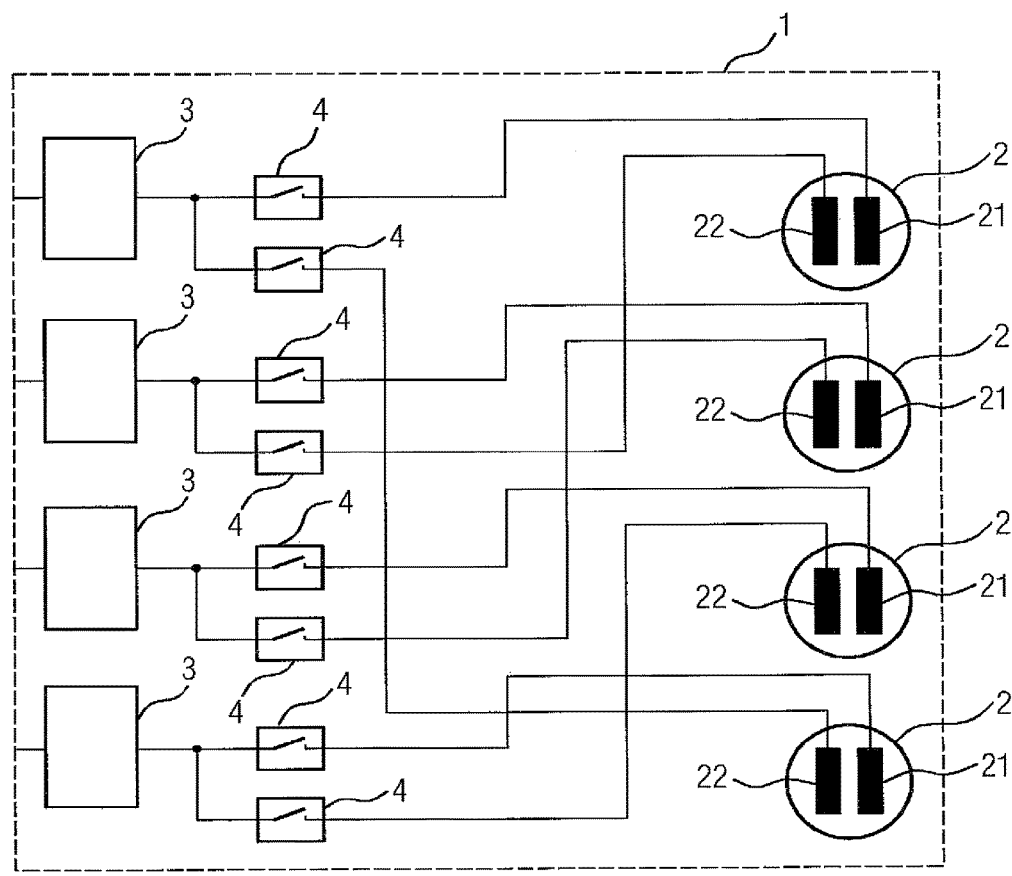
FIG. 6 shows a further drive system according to the invention comprising 4 inverters and 4 motors.

FIG. 6 shows a further exemplary embodiment of a drive system 1 comprising four motors 2 and four inverters 3. In order to avoid repetition in respect of corresponding constituent parts of the system, reference is once again made to the description relating to the preceding figures and to the reference symbols introduced there. This exemplary embodiment shows how it is possible to connect four motors 2 comprising in each case two winding systems 21, 22 to a total of four inverters 3. However, in this example, it is no longer possible to identify the individual inverters 3 as first inverter 31 and second inverter 32 since each inverter 3 is a different inverter 3 for a different motor. For example, the topmost inverter 3 is the first inverter 31 and the inverter 3 situated below said topmost inverter is the second inverter 32 for the topmost motor 2 illustrated in FIG. 6. For the second motor from the top, the situation is that the second-topmost inverter 3 is the first inverter 31 and the third-topmost inverter 3 is the second inverter 32. With this design, the two winding systems 21, 22 of the motors can be identical or differ, in particular, in respect of the number of turns. In this case, the individual winding systems can be arranged in the same phase or have an offset in relation to one another. In the present exemplary embodiment, an offset through an angle of 90° or 180° is possible. This interconnection between inverters 3 and the individual winding systems 21, 22 of the motors 2 ensures that one motor fails entirely, that is to say no longer delivers torque or power, even in the event of failure of two inverters 3 at most. The remaining motors can continue to be operated at least at a reduced torque or at reduced power. At the same time, it is possible to actively influence the distribution of the individual torques or powers to the motors while selecting an offset between the individual winding systems.

Figure 7:
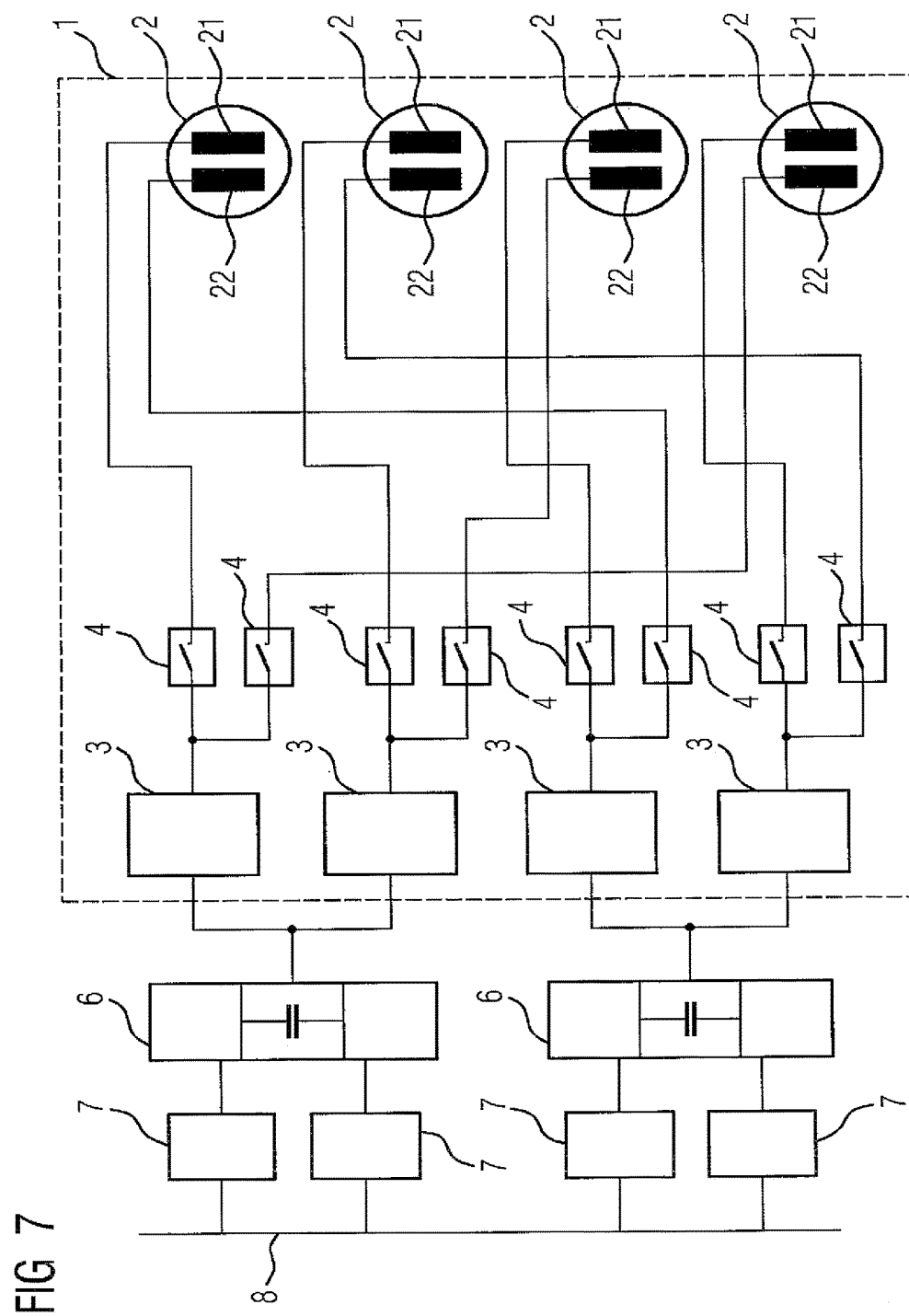
FIG. 7 shows a further drive system according to the invention, in which the winding systems of each motor are fed by inverters of different intermediate circuits.

FIG. 7 shows a further exemplary application of a drive system 1 according to the invention. This exemplary embodiment indicates how the inverters 3 can be supplied with energy from the energy supply system 8. In order to avoid repetition in respect of corresponding constituent parts of the drive system, reference is once again made to the descriptions relating to FIGS. 1 to 6 and the reference signs introduced there. The input current converters 7 draw energy from the energy supply system 8 in order to feed said energy to an intermediate circuit 6. The intermediate circuit 6 in turn supplies the individual current inverters 3. For reasons of redundancy, it is expedient to provide at least two intermediate circuits 6. Therefore, the motors 2 do not fail entirely even in the event of failure of one intermediate circuit 6, and the individual winding systems 21, 22 of the motors 2 are supplied by inverters 3 which are fed with energy from different intermediate circuits 6. Even in the event of failure of an intermediate circuit 6 and the associated failure of the inverters 3 which are connected to said intermediate circuit, at least one winding system 21, 22 of the motors 2 can still be supplied with energy. This leads to a high degree of supply reliability of the drive system 1 according to the invention.

Although the invention has been illustrated and described in detail by the preferred exemplary embodiments, the invention is not restricted solely to the disclosed examples and other variations can be derived by a person skilled in the art without departing from the scope of protection of the invention.

What is claimed is:

1. A drive system, comprising:
   at least two inverters; and
   at least two motors, each said motor including a stator, a rotor interacting with the stator, and first and second winding systems disposed in the stator, said first winding system being electrically conductively connected to a first one of the inverters, and said second winding system being electrically conductively connected to a second one of the inverters, said first and second winding systems being configured to enable the inverters to control a power distribution and/or torque distribution between the motors.

2. The drive system of claim 1, wherein the power distribution and/or torque distribution between the motors is controlled by the inverters through open-loop control and/or closed-loop control.

3. The drive system of claim 1, wherein the first and second winding systems differ from one another in terms of number of turns or position.

4. The drive system of claim 1, further comprising a third inverter, said at least two motors having each in the stator a third winding system which is electrically conductively connected to the third inverter.

5. The drive system of claim 1, wherein the inverters are arranged on different intermediate circuits.

6. The drive system of claim 1, further comprising switches arranged in electrical connections between the inverters and the winding systems of the motors.

7. The drive system of claim 6, further comprising a central control device configured to activate the inverters and/or the switches.

8. A vehicle, in particular aircraft or rail vehicle, comprising a drive system comprising at least two inverters, and at least two motors, each said motor including a stator, a rotor interacting with the stator, and first and second winding systems disposed in the stator, said first winding system being electrically conductively connected to a first one of the inverters, and said second winding system being electrically conductively connected to a second one of the inverters, said first and second winding systems being configured to enable the inverters to control a power distribution and/or torque distribution between the motors.

9. The vehicle of claim 8, wherein the power distribution and/or torque distribution between the motors is controlled by the inverters through open-loop control and/or closed-loop control.

10. The vehicle of claim 8, wherein the first and second winding systems differ from one another in terms of number of turns or position.

11. The vehicle of claim 8, wherein the drive system includes a third inverter, said at least two motors having each in the stator a third winding system which is electrically conductively connected to the third inverter.

12. The vehicle of claim 8, wherein the inverters are arranged on different intermediate circuits.

13. The vehicle of claim 8, wherein the drive system includes switches arranged in electrical connections between the inverters and the winding systems of the motors.

14. The vehicle of claim 13, wherein the drive system includes a central control device configured to activate the inverters and/or the switches.

15. An airplane, comprising a drive system comprising at least two inverters, and at least two motors arranged on opposite sides of the airplane, with one of the two motors being arranged on a right-hand-side wing and the other one of the two motors being arranged on a left-hand-side wing, each said motor including a stator, a rotor interacting with the stator, and first and second winding systems disposed in the stator, said first winding system being electrically conductively connected to a first one of the inverters, and said second winding system being electrically conductively connected to a second one of the inverters, said first and second winding systems being configured to enable the inverters to control a power distribution and/or torque distribution between the motors.

16. A method for redundant operation of a drive system, comprising:
    electrically conductively connecting a first winding system in a stator of each of at least two motors with a first inverter;
    electrically conductively connecting a second winding system in the stator with a second inverter; and
    in the event of a failure of one of the first and second inverters, exchanging electrical energy with the other one of the first and second inverters and/or a third inverter electrically connected to a third winding system in the stator.

17. The method of claim 16, further comprising coordinating a flow of electrical energy between the first, second and third inverters and the first, second and third winding systems of the motors via switches and/or a central control device.

18. The method of claim 17, wherein in response to an identification of the failure of the one of the inverters, the central control device opens an associated one of the switches at an output of the one of the inverters to thereby disconnect the one of the inverters from a connected one of the at least two motors.

19. The method of claim 16, arranging the first, second and third inverters on different intermediate circuits.

* * * * *